G. W. SMITH.
MILLING MACHINE.
APPLICATION FILED OCT. 30, 1911.

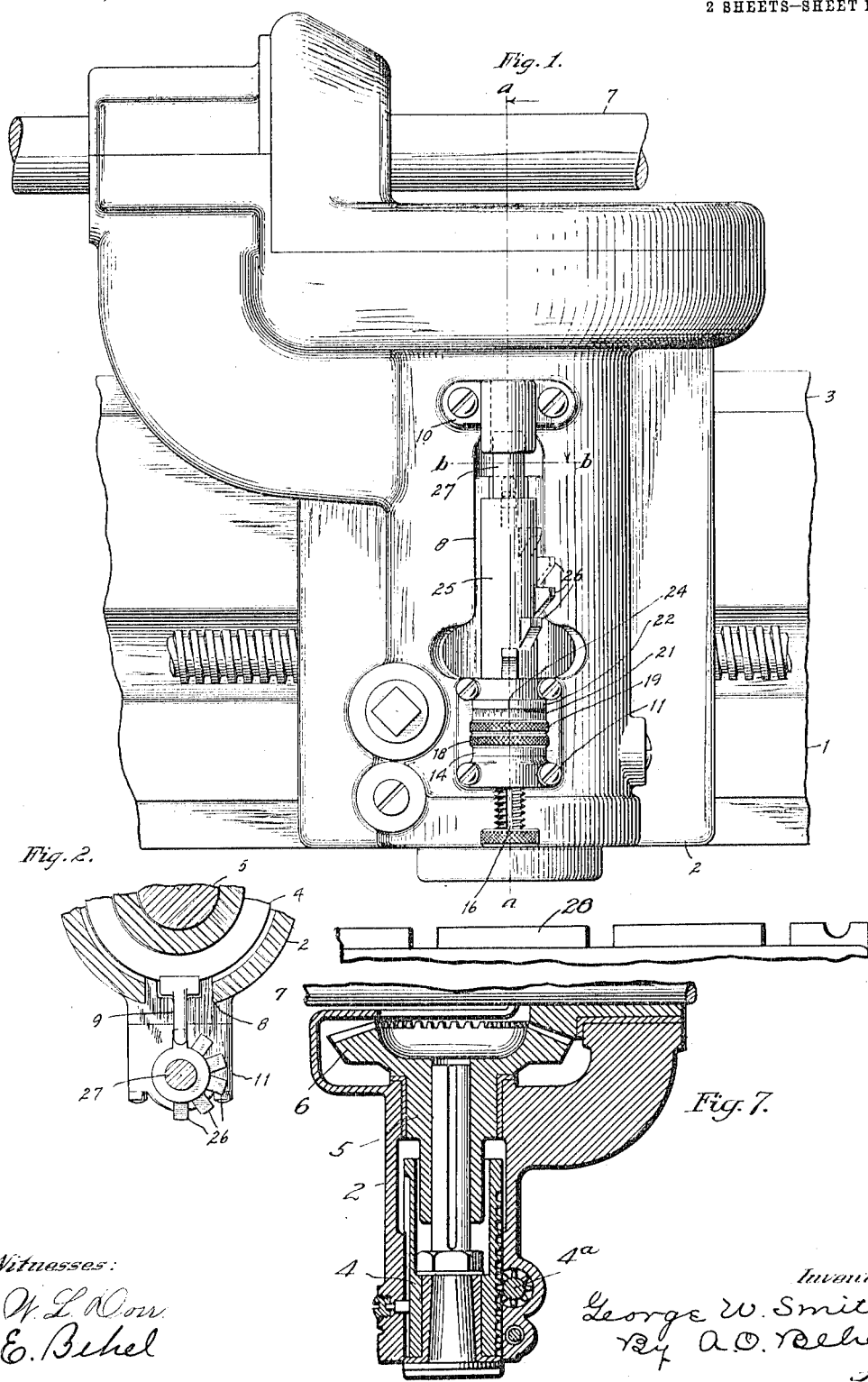

1,081,932.

Patented Dec. 16, 1913.

2 SHEETS—SHEET 2.

Witnesses:
W. L. Dow
E. Behel

Inventor:
George W. Smith
By A. O. Behel
Atty.

UNITED STATES PATENT OFFICE.

GEORGE W. SMITH, OF ROCKFORD, ILLINOIS, ASSIGNOR TO THE INGERSOLL MILLING MACHINE COMPANY, OF ROCKFORD, ILLINOIS.

MILLING-MACHINE.

1,081,932.  Specification of Letters Patent.  Patented Dec. 16, 1913.

Application filed October 30, 1911. Serial No. 657,671.

*To all whom it may concern:*

Be it known that I, GEORGE W. SMITH, a citizen of the United States, residing at Rockford, in the county of Winnebago and State of Illinois, have invented certain new and useful Improvements in Milling-Machines, of which the following is a specification.

The object of this invention is to provide an adjustable stop with a micrometer adjustment for the spindle of a milling or drilling machine.

Figure 5:
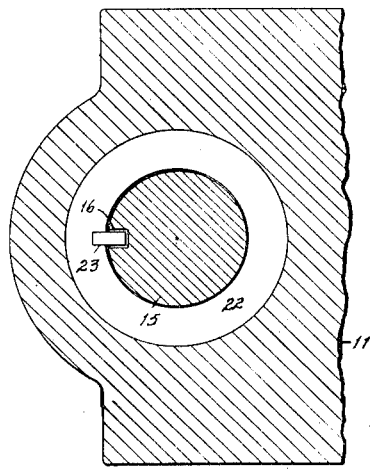
Figure 3:
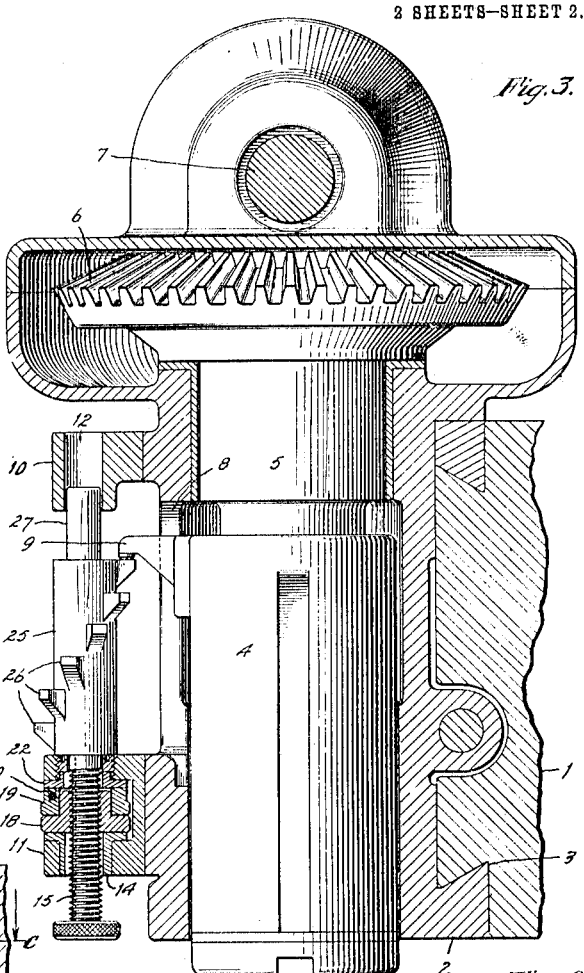
Figure 4:
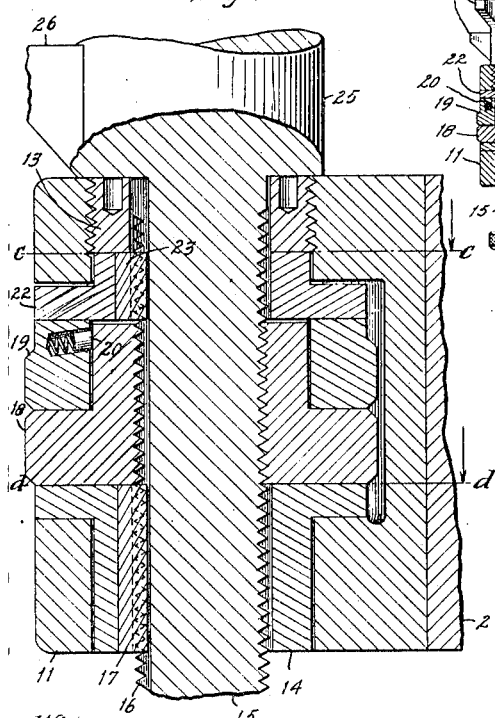
Figure 6:
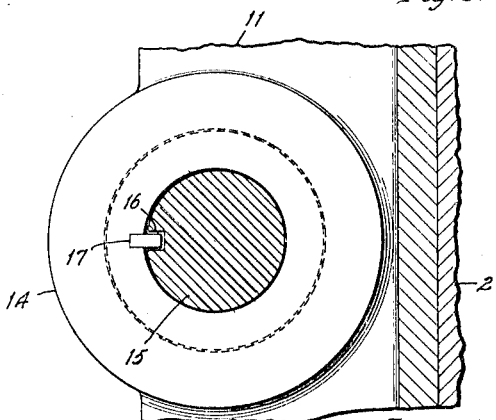

In the accompanying drawings, Figure 1 is a face elevation of the slidable head of a milling machine supporting a spindle, and to which I have applied my improvements. Fig. 2 is a section on line $b\,b$ Fig. 1. Fig. 3 is a view partly in section on line $a\,a$ Fig. 1. Fig. 4 is a section on an enlarged scale of the micrometer adjustment. Fig. 5 is a section on line $c\,c$ Fig. 4. Fig. 6 is a section on line $d\,d$ Fig. 4. Fig. 7 is a section at right angles to Fig. 3.

My improvements are shown in the drawings as applied to a milling machine, in which the frame or base 1 supports a slidable head 2 on ways 3. A sleeve 4 is supported to slide vertically in the head 2 and supports a spindle 5 to which is connected a bevel gear 6 which is rotated by a gear, not shown, connected to the drive shaft 7. The head 2 is formed with a face opening 8 through which extends a holding device in the form of a finger 9 connected to and movable with the sleeve 4.

To the head, above and below the face opening 8 are secured two brackets 10 and 11. The bracket 10 has a vertical opening 12, the upper section of the bracket 11 is internally screw-threaded within which is screw-threaded a bushing 13, and within the lower section of the bracket 11 is located a bushing 14. A screw 15 is located in the bushings 13 and 14 and is formed with a slot 16 extending in its lengthwise direction. A key 17 is supported by the bushing 14 and is located in the slot 16 of the screw 15. Around the screw 15 and above the bushing 14 is located an internally screw-threaded adjusting nut 18 having a screw-thread engagement with the screw 15. A collar 19 is supported by the adjusting nut 18 and a spring actuated plunger 20 carried by the collar contacts with the nut 18 forming a frictional engagement between the collar and nut and which allows of the movement of the collar with respect to the nut, and when the nut is turned, the collar may turn by it. This collar 19 is formed with graduations 21. Between the collar 19 and the bushing 13 is located a ring 22, provided with a key-way within which is located a key 23 and located in the slot 16 of the screw 15. This ring has an index mark 24, Fig. 1. The above structure constitutes a micrometer.

The center section 25 of the screw 15 is cylindrical and enlarged, forming a stop carrier, and from its face extend radially a plurality of stop projections 26 located spirally around the same. The upper end 27 of the screw 15 is reduced in diameter and is located in the opening 12 in the bracket 10. The brackets 10 and 11 serve to hold the screw 15 in a vertical position, but permit it to be turned axially.

By turning the screw 15 axially any one of the stops 26 can be located beneath the finger 9, and in thus turning this screw the bushing 14, adjusting nut 18, collar 19 and ring 22 will also be turned. When the proper stop has been located beneath the finger 9, an adjustment of the stop vertically can be obtained by turning the adjusting nut 18 which will move the screw vertically without turning it axially. Before the adjusting nut is turned the collar 19 may be turned to locate the graduations properly with the index mark 24.

Beneath the representation of Fig. 1 in the drawings is shown an indication of a work supporting table 28.

The sleeve carrying the finger 9 will be moved up and down by the usual cross shaft $4^a$, see Fig. 7, during the operation of the tool carried by the spindle.

It is evident that my improvements may be applied to a drilling machine without departing from the scope of my invention.

I claim as my invention.

1. The combination of a reciprocating tool support, a finger extending from the support, an axially movable screw, a plurality of stops carried by the screw and adjustable to locate any one of them in the path of the finger and a micrometer adjustment for the screw.

2. The combination of a reciprocating tool support, a finger extending from the support, a screw supporting a plurality of stops that are adjustable to locate any one of them in the path of the finger, and an adjusting nut for moving the screw lengthwise.

3. The combination of a reciprocating tool support, a finger extending from the support, a screw supporting a plurality of stops that are adjustable to locate any one of them in the path of the finger, an adjusting nut for moving the screw lengthwise, a graduated collar carried by the nut, and a ring supporting an index mark rotatable with the screw.

4. The combination with relatively movable base and tool supporting members, of a holding device carried by one member, a stop carrier rotatably mounted on the other member and having a plurality of stepped stops respectively movable into the path of the holding device on the rotation of the carrier, said carrier also having a longitudinal movement, and means for determining its longitudinal movement.

5. The combination with relatively movable base and tool supporting members, of a holding device carried by one member, a stop carrier rotatably mounted on the other member and having a plurality of stepped stops respectively movable into the path of the holding device on the rotation of the carrier, said carrier also having a longitudinal movement, and a micrometer for effecting a minute longitudinal movement of the stop carrier.

6. The combination with relatively movable base and tool supporting members, of a holding device carried by one member, a stop carrier rotatably and longitudinally movable on the other member and having a plurality of stops projecting from the same and disposed in substantially stepped relation, said stop projections being respectively movable into the path of the holding device on the rotation of the carrier, and means for longitudinally adjusting said carrier.

7. The combination with relatively movable base and tool supporting members, of a holding device carried by one member, a stop carrier rotatably and longitudinally movable on the other member and having a plurality of stops projecting from the same and disposed in substantially stepped relation, said stop projections being respectively movable into the path of the holding device on the rotation of the carrier, said carrier having a screw threaded portion, and means engaging the screw threaded portion for longitudinally adjusting the carrier and the stop projections thereon.

8. The combination with a base, of a tool-supporting member movably mounted thereon, a finger carried by the tool-supporting member, a stop carrier rotatably mounted on the base and also capable of longitudinal movement, said stop carrier having a plurality of stepped stop projections that are respectively movable into the path of the finger upon the rotation of the carrier, a threaded stem projecting from one end of the carrier, and a micrometer threaded on the stem for effecting the longitudinal movement of the carrier and permitting of its rotation.

In testimony whereof I have hereunto set my hand in presence of two subscribing witnesses.

GEORGE W. SMITH.

Witnesses:
 A. O. BEHEL,
 E. D. E. N. BEHEL.